United States Patent
Tian et al.

(10) Patent No.: US 11,290,875 B2
(45) Date of Patent: Mar. 29, 2022

(54) BLUETOOTH NETWORK AND NETWORK CONFIGURATION METHOD

(71) Applicant: Espressif Systems (Shanghai) Co., Ltd., Shanghai (CN)

(72) Inventors: Hao Tian, Shanghai (CN); Swee Ann Teo, Shanghai (CN); Xiangjun Xu, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 17 days.

(21) Appl. No.: 16/462,361

(22) PCT Filed: Aug. 6, 2018

(86) PCT No.: PCT/CN2018/098921
§ 371 (c)(1),
(2) Date: May 20, 2019

(87) PCT Pub. No.: WO2019/029471
PCT Pub. Date: Feb. 14, 2019

(65) Prior Publication Data
US 2021/0058770 A1    Feb. 25, 2021

(30) Foreign Application Priority Data
Aug. 10, 2017  (CN) .......................... 201710681659.1

(51) Int. Cl.
*H04W 12/033*  (2021.01)
*H04W 4/80*  (2018.01)
(Continued)

(52) U.S. Cl.
CPC ....... *H04W 12/033* (2021.01); *H04L 63/0442* (2013.01); *H04W 4/80* (2018.02);
(Continued)

(58) Field of Classification Search
CPC ... H04W 12/033; H04W 4/80; H04W 12/121; H04W 12/106; H04W 12/0433; H04W 12/041; H04W 12/06; H04L 63/0442
See application file for complete search history.

(56) References Cited

U.S. PATENT DOCUMENTS 9,516,579 B1    12/2016  Diner et al.
9,736,699 B1 *   8/2017  Rao .......................... H04W 4/80
(Continued)

FOREIGN PATENT DOCUMENTS

CN       101707767      5/2010
CN       105357666      2/2016
(Continued)

*Primary Examiner* — Michael R Vaughan
(74) *Attorney, Agent, or Firm* — Reinhart Boerner Van Deuren P.C.

(57) ABSTRACT

The invention discloses a method for network configuration via Bluetooth, the method comprising: a Bluetooth communication device establishing a connection to a mobile terminal via Bluetooth; the Bluetooth communication device and the mobile terminal negotiating to determine a data encryption mode and a shared key for data decryption; connecting the Bluetooth communication device to an external wireless network; configuring the wireless network via Bluetooth is realized. According to the invention, during the process of network configuration via Bluetooth, a symmetric encryption method is utilized as the encryption mode for message data, and an asymmetric encryption method is utilized to generate the corresponding shared key, ensuring the data security during network configuration via Bluetooth and network communication processes.

6 Claims, 1 Drawing Sheet

(51) Int. Cl.
*H04W 12/121* (2021.01)
*H04W 12/106* (2021.01)
*H04W 12/0433* (2021.01)
*H04W 12/041* (2021.01)
*H04L 29/06* (2006.01)
*H04W 12/06* (2021.01)

(52) U.S. Cl.
CPC ..... *H04W 12/041* (2021.01); *H04W 12/0433* (2021.01); *H04W 12/06* (2013.01); *H04W 12/106* (2021.01); *H04W 12/121* (2021.01)

(56) References Cited

U.S. PATENT DOCUMENTS 10,091,242 B2 * 10/2018 Britt ................ H04L 63/061
2015/0318874 A1 * 11/2015 Donaldson ............. H04W 4/80
367/135

FOREIGN PATENT DOCUMENTS

| CN | 105516896 | 4/2016 | | |
|---|---|---|---|---|
| CN | 105592409 | 5/2016 | | |
| CN | 106961665 | 7/2017 | | |
| CN | 107231627 | 10/2017 | | |
| EP | 2615869 B1 * | 4/2014 | ............ | H04W 48/10 |
| WO | WO-2016026317 A1 * | 2/2016 | ............ | H04W 12/50 |
| WO | WO-2018120553 A1 * | 7/2018 | ............ | H04W 4/00 |

* cited by examiner

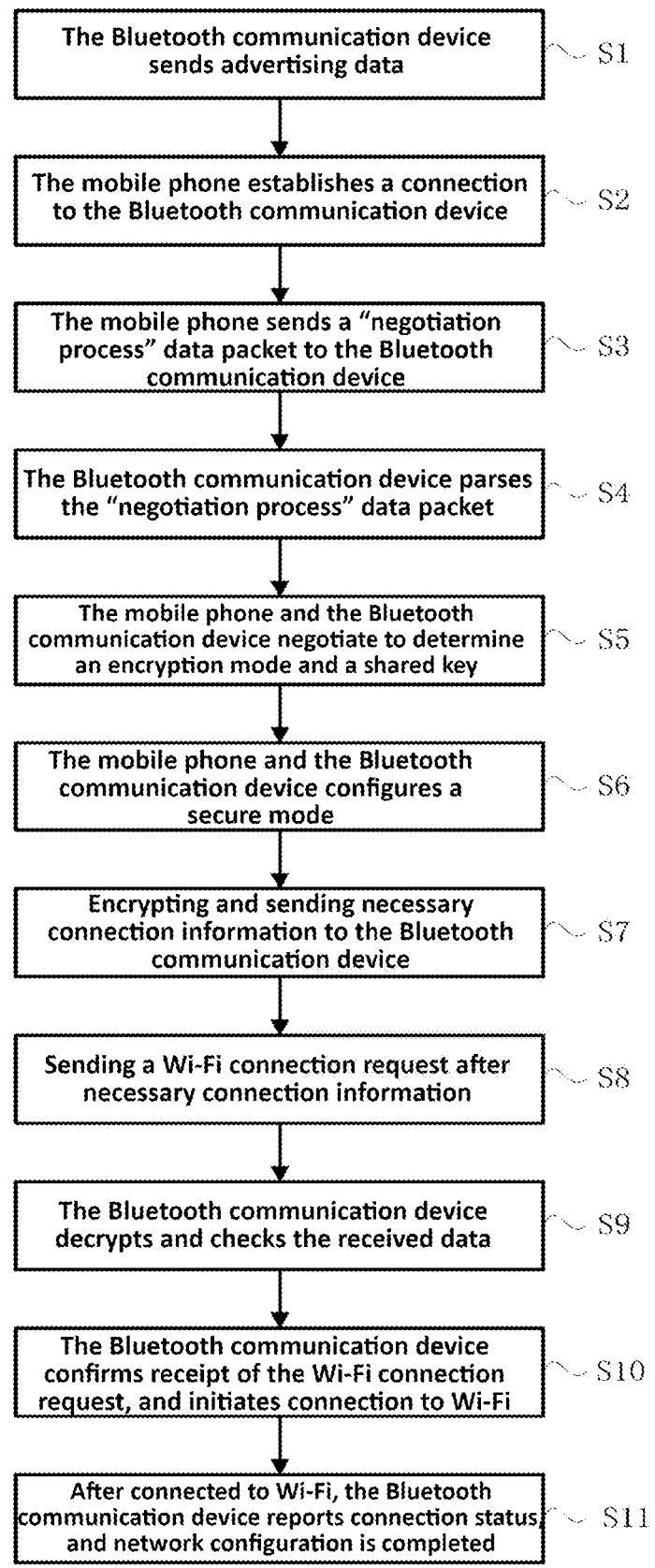

BLUETOOTH NETWORK AND NETWORK CONFIGURATION METHOD

TECHNICAL FIELD

The invention relates to a networking technology, particularly to a Bluetooth network and a network configuration method.

BACKGROUND ART

Bluetooth® is a wireless technology standard, which may realize short distance data exchange among stationery devices, mobile devices, and building personal area networks (using UHF radio wave in ISM bands of 2.4-2.485 GHz). Bluetooth technology was originally created by the telecom giant Ericsson in 1994, which was then intended as an alternative for RS232 data cables. Bluetooth enables connections to multiple devices, and overcomes the problem of data synchronization.

Network configuration via Bluetooth is referred to as BluFi in short. The functionality mainly defines necessary connection information for using a GATT Server (Generic Attribute Profile services) to realize connection to a Wi-Fi network through a GATT Client (Generic Attribute Profile client, e.g., mobile phone), such that a profile is implemented for connecting a Wi-Fi device an AP or configuring and using SoftAP.

SUMMARY OF THE INVENTION

The invention provides a Bluetooth network and network configuration method, which enables configuring a wireless network via Bluetooth, and ensures the data security during Network configuration via Bluetooth and network communication processes.

In order to achieve the above described object, the invention provides a method for network configuration via Bluetooth, wherein the method comprises:

a Bluetooth communication device establishing a connection to a mobile terminal via Bluetooth;

the Bluetooth communication device and the mobile terminal negotiating to determine a data encryption mode and a shared key for data decryption;

connecting the Bluetooth communication device to an external wireless network.

The above described method of the Bluetooth communication device establishing a connection to a mobile terminal via Bluetooth comprises:

the Bluetooth communication device enabling Generic Attribute Profile services functionality, and sending advertising with preset advertising data;

the mobile terminal receiving the advertising from the Bluetooth communication device, establishing a connection to the Bluetooth communication device as a preset Generic Attribute Profile Service client.

The above described method of the Bluetooth communication device and the mobile terminal negotiating to determine a data encryption mode and a shared key for data decryption comprises:

the mobile terminal sending a "negotiation procedure" data packet to the Bluetooth communication device;

after receiving the "negotiation procedure" data packet, the Bluetooth communication device parsing the data packet according to a preset "negotiation procedure", so as to determine the encryption mode for data to be sent from the mobile terminal to the Bluetooth communication device, and generate the corresponding shared key through an asymmetric encryption method.

The above described Bluetooth communication device establishing a network connection to the external wireless network comprises:

the mobile terminal encrypting connection information for the connection to the external wireless network and sending the encrypted connection information to the Bluetooth communication device, and after the encrypted connection information is sent, sending a network connection request to the Bluetooth communication device;

the Bluetooth communication device receiving data from the mobile terminal and decrypting the data with the shared key;

when the Bluetooth communication device receiving the network connection request, determining that the conformation for network connection is completely transmitted, and initiating the connection to the external wireless network;

after being connected to the external wireless network, the Bluetooth communication device sending connection status information of the wireless network to the mobile terminal.

The above described encryption mode for the data is generated through a symmetric encryption method.

After receiving the data from the mobile terminal, the Bluetooth communication device performs integrity check, secure signature check, and anti-replay check on message.

The Bluetooth communication device negotiating and generating information of the shared key is processed in the application layer; if not processed in the application layer, an DH encryption algorithm provided by the method for network configuration via Bluetooth may be used to negotiate the key.

After connecting the Bluetooth communication device to the external wireless network, the mobile terminal configures the wireless network through the Bluetooth communication device.

A Bluetooth network, wherein the network comprises:

a Bluetooth communication device, which connects to an external wireless network;

a mobile terminal, which is communicatively connected with the Bluetooth communication device via Bluetooth, and connected to an external wireless network through the Bluetooth communication device; the Bluetooth communication device and the mobile terminal negotiate to use a symmetric encryption method to as a data encryption mode, and use an asymmetric encryption method to generate a shared key for data decryption.

The Bluetooth communication device is provided with a dual-mode chip supporting Wi-Fi and Bluetooth.

As compared with prior arts, the Bluetooth network and network configuration method according to the invention have the advantage that According to the invention, during the process of network configuration via Bluetooth, a symmetric encryption method is utilized as the encryption mode for message data, and an asymmetric encryption method is utilized to generate the corresponding shared key, ensuring the data security during Network configuration via Bluetooth and network communication processes;

According to the invention, after having received the data from the mobile terminal, the Bluetooth communication device performs integrity check, secure signature check, and anti-replay check on the message, ensuring data security, integrity, and identity security.

BRIEF DESCRIPTION OF THE DRAWINGS

FIG. 1 is a flow chart of a method for network configuration via Bluetooth according to the invention.

DETAILED DESCRIPTION OF THE PREFERRED EMBODIMENTS

The particular embodiments of the invention will be further described with reference to the drawings.

In the following, an embodiment of a method for network configuration via Bluetooth will be particularly disclosed, in which BluFi network configuration includes two parts, namely, SoftAP and Station configurations. The station configuration in BluFi network configuration includes the steps of advertising, connection, service discovery, negotiating a shared key, transmitting data, transmitting back connection status, etc. In the present embodiment, station configuration will be taken as an example for describing the configuration steps.

In the present embodiment, a mobile phone will be described as a most commonly used GATT Client; the BluFi network configuration mainly has two functions: one is to receive data from the mobile phone end, and the other is to send data to the mobile phone end. Certainly, BluFi further comprises some important functions, e.g., slicing in BluFi layer, data encryption and verification in BluFi layer, and data confirmation in BluFi layer. Based on the present embodiment, a user may realize symmetric encryption, asymmetric encryption, and check algorithm in the process of BluFi network configuration; in the present embodiment, by default, DH algorithm is used to negotiate the key, 128-AES is used for data encryption, and CRC16 is used for data verification.

As shown in FIG. 1, the particular process of a method for network configuration via Bluetooth according to an embodiment of the invention is illustrated, which specifically comprises the following steps:

S1) a Bluetooth communication device enables Generic Attribute Profile services (GATT Server) functionality, and sends advertising with particular preset advertising data (adv data), in which the advertising is customized by the user, instead of by the BluFi Profile.

In the present embodiment, the Bluetooth communication device is implemented as a device provided with an ESP32 chip, the ESP32 chip being a dual-mode chip supporting Wi-Fi and Bluetooth.

S2) an APP pre-installed on a mobile terminal (a mobile phone in the present embodiment) receives the advertising from the Bluetooth communication device, and operates as a preset Generic Attribute Profile client (GATT Client) to establish a connection to the Bluetooth communication device, in which the mobile APP may be customized by the user.

S3) after the Bluetooth communication device and the mobile phone are successfully connected, the mobile phone sends a "negotiation procedure" data packet to the Bluetooth communication device.

S4) after the Bluetooth communication device receives the "negotiation procedure" data packet, it will parse the data packet according to a user customized "negotiation procedure".

S5) the mobile phone and the Bluetooth communication device negotiate to determine an encryption mode for data to be sent from the mobile terminal to the Bluetooth communication device, and negotiate to determine a shared key for data decryption.

In this regard, the encryption mode may utilize symmetric encryption algorithms, such as AES or DES.

The shared key may be generated through negotiation utilizing asymmetric encryption algorithms, such as DH, RSA, or ECC.

In particular, when performing symmetric encryption and decryption, the data length before encryption and decryption must be consistent with the data length after the encryption and decryption, and in-place encryption and decryption are supported.

In the code at the ESP32 chip end, secure processing procedures, such as key negotiation, may be determined and developed by the user. The mobile APP sends to the ESP32 chip sends negotiate data (Negotiate Data), and packets with Negotiate Data type will be sent to the application layer for processing. If the application layer does not process the packets, a DH encryption algorithm provided by BluFi may be utilized to negotiate the key. The application layer shall register the following security-related functions with BluFi:

1) function 1: typedef void (*esp_blufi_negotiate_data_handler_t)(uint8_t*data, int len, uint8_t**output_data, int*output_len, bool*need_free);

The function 1 operates to receive normal data during negotiation, and after its processing is completed, the function 1 needs to use output_data and output_len to pass out the data to be sent. BluFi may, after having called negotiate_data_handler, send the output_data passed out by the negotiate_data_handler. The output_data is prefixed with two "*", because the length of data to be finally sent is unknown, the function may have to perform malloc by itself or refer to a global variable, and need_free is utilized to notify whether it is needed to free memory.

2) function 2: typedef int (*esp_blufi_encrypt_func_t) (uint8_t iv8, uint8_t*crypt_data, int cyprt_len);

function 2 shows that the data lengths for encryption and decryption must be consistent.

3) function 3: typedef int (*esp_blufi_decrypt_func_t) (uint8_t iv8, uint8_t*crypt_data, int crypt_len);

function 3 indicates that the data lengths for encryption and decryption must be consistent.

4) function 4: typedef uint16 t (*esp_blufi_checksum_func_t) (uint8_t iv8, uint8_t*data, int len);

The function 4 is utilized to compute a checksum, and its return value is the value of the checksum. BluFi may use the return value of function 4 to compare with a checksum at the end of the packet.

S6) after the negotiation is completed, the mobile phone end sends a "setting secure mode" control packet to the Bluetooth communication device. The "setting secure mode" control packet indicates an integrity check method, an identity security signature verification method, and an anti-replay check method to be performed on the message after the Bluetooth communication device receives the data from the mobile terminal. After having received the "setting secure mode" control packet, the Bluetooth communication device will use the negotiated shared key and the configured security policy to perform encryption and decryption on the communication data.

The message integrity check method may utilize check algorithms such as SHA1, MD5, and CRC.

The identity security signature verification method may utilize algorithms such as RSA or DH to perform signature verification. In this regard, the RSA algorithm may guarantee the identity security, while the DH algorithm by itself may not guarantee the identity security and may require additional algorithms to verify the signature.

The anti-replay check method may include: adding packet transmitting Sequence, and the Sequence is considered in data verification.

Further, secure mode may be set at any time during the network configuration process, and after receiving the configuration of the secure mode, ESP32 may perform security-related operations according to modes specified by the secure mode.

S7) the mobile phone may send necessary connection information, such as user name and password as defined by "BluFi transmission format" for Wi-Fi connection, after encrypted by a symmetric encryption algorithm, to the Bluetooth communication device.

S8) when the mobile phone has sent all the necessary connection information for connection, the mobile phone sends a "Wi-Fi connection request" to the Bluetooth communication device.

S9) the Bluetooth communication device receives the data sent from the mobile terminal including the connection information and the "Wi-Fi connection request", performs decryption with the shared key, and performs integrity check, identity security signature verification, and anti-replay check.

S10) when the Bluetooth communication device confirms receipt of the "Wi-Fi connection request", it is determined that the mobile phone has completed the transmission of the necessary connection information for Wi-Fi connection, and initiates connection to the Wi-Fi network.

S11) after connected to the Wi-Fi network, the Bluetooth communication device will send a "Wi-Fi connection status report" packet to the mobile phone, so as to report the connection status. The network configuration is completed.

Further, the mobile phone may configure the Wi-Fi network via Bluetooth.

The invention further discloses a Bluetooth network suitable for the above described method for network configuration via Bluetooth, the Bluetooth communication network comprises: a Bluetooth communication device, and a mobile terminal.

The Bluetooth communication device may be implemented as a communication device provided with a dual-mode chip supporting Wi-Fi and Bluetooth, e.g., an ESP32 chip, which is utilized to connect to the mobile terminal via Bluetooth, and connect to a Wi-Fi network via a Wi-Fi connection.

The mobile terminal may be a mobile phone, a tablet, etc., which is communicatively connected with the Bluetooth communication device via Bluetooth, and is connected with the Wi-Fi network through the Bluetooth communication device, so as to configure the Wi-Fi network.

In addition to the above described preferred embodiment for configuring a Wi-Fi Station, the invention may, in terms of configuring Wi-Fi mode, further include but not limited to configuring Wi-Fi Station, AP, Hotspot, Sniffer, etc.; the invention, in terms of software and/or hardward implementations, may include but not limited to various embedded software, mobile phone/tablet APPs, Web servers, etc.

Although the disclosure of the invention is described in detail with reference to the above described preferred embodiments, it shall be understood that the above described description shall be not considered as limitations to the invention. A person of ordinary skilled in the art shall understand that various modifications and substitutions to the invention will become apparent after reading the above described disclosure. Thus, the scope of protection of the invention shall be defined according to the appended claims.

The invention claimed is:

1. A method for network configuration via Bluetooth, wherein the method comprises:
    a Bluetooth communication device establishing a connection to a mobile terminal via Bluetooth, wherein the Bluetooth communication device is provided with a dual-mode chip supporting Bluetooth and Wi-Fi;
    the Bluetooth communication device and the mobile terminal negotiating to determine a data encryption mode and a shared key for data decryption via Bluetooth, through a negotiation procedure customized by a user;
    the Bluetooth communication device receiving, from the mobile terminal, encrypted connection information for an external Wi-Fi network corresponding to the connection information via Bluetooth, and decrypting the received connection information;
    connecting the Bluetooth communication device to the external Wi-Fi network corresponding to the decrypted connection information via the dual-mode chip of the Bluetooth communication device;
    after connecting the Bluetooth communication device to the external Wi-Fi network, the mobile terminal configures the external Wi-Fi network via the Bluetooth connection between the mobile terminal and the Bluetooth communication device.

2. The method for network configuration via Bluetooth according to claim 1, wherein the step of the Bluetooth communication device establishing a connection to a mobile terminal via Bluetooth comprises:
    the Bluetooth communication device enabling Generic Attribute Profile services functionality, and sending advertising with preset advertising data;
    the mobile terminal receiving the advertising from the Bluetooth communication device, and establishing a connection to the Bluetooth communication device as a preset Generic Attribute Profile Service client.

3. The method for network configuration via Bluetooth according to claim 1, wherein the encryption mode for the data is generated through a symmetric encryption method; and wherein the step of the Bluetooth communication device and the mobile terminal negotiating to determine a data encryption mode and a shared key for data decryption comprises:
    the mobile terminal sending a "negotiation procedure" data packet to the Bluetooth communication device;
    after receiving the "negotiation procedure" data packet, the Bluetooth communication device parsing the data packet according to a preset "negotiation procedure", so as to determine the encryption mode for data to be sent from the mobile terminal to the Bluetooth communication device, and generate the corresponding shared key through an asymmetric encryption method.

4. The method for network configuration via Bluetooth according to claim 3, wherein the step of connecting the Bluetooth communication device to the external Wi-Fi network comprises:
    the mobile terminal encrypting connection information for the connection to the external Wi-Fi network and sending the encrypted connection information to the Bluetooth communication device, and after the encrypted connection information is sent, sending the network connection request to the Bluetooth communication device;
    the Bluetooth communication device receiving data from the mobile terminal and decrypting the data with the shared key;

when the Bluetooth communication device receiving the network connection request, determining that the conformation for network connection is completely transmitted, and initiating the connection to the external Wi-Fi network;

after being connected to the external Wi-Fi network, the Bluetooth communication device sending connection status information of the external Wi-Fi network to the mobile terminal.

5. The method for network configuration via Bluetooth according to claim 3, wherein after receiving the data from the mobile terminal, the Bluetooth communication device performs integrity check, secure signature check, and anti-replay check on message.

6. The method for network configuration via Bluetooth according to claim 3, wherein the Bluetooth communication device negotiating and generating information of the shared key is processed in the application layer; if not processed in the application layer, an DH encryption algorithm provided by the network configuration via Bluetooth may be used to negotiate the key.

\* \* \* \* \*